US007007129B2

(12) United States Patent
Sekine et al.

(10) Patent No.: US 7,007,129 B2
(45) Date of Patent: Feb. 28, 2006

(54) TAPE MANAGEMENT METHOD BY WHICH A VIRTUAL TAPE FILE EMULATED ON A DISK DRIVE IS COPIED BETWEEN DISK DRIVES

(75) Inventors: Michiaki Sekine, Tokyo (JP); Takeaki Murakoso, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 10/695,890

(22) Filed: Oct. 30, 2003

(65) Prior Publication Data
US 2004/0148458 A1 Jul. 29, 2004

(30) Foreign Application Priority Data
Jan. 27, 2003 (JP) .............................. 2003-017033

(51) Int. Cl.
*G06F 13/00* (2006.01)
(52) U.S. Cl. .............................. 711/4; 711/162; 711/6; 703/24; 714/6; 709/217
(58) Field of Classification Search .................. 703/24, 703/26, 13, 14, 23; 369/13, 27; 711/4, 111, 711/162; 714/6
See application file for complete search history.

(56) References Cited

U.S. PATENT DOCUMENTS

| 5,127,094 A | * | 6/1992 | Bono .............................. 711/2 |
| 5,297,124 A | * | 3/1994 | Plotkin et al. ................. 360/49 |
| 5,438,674 A | * | 8/1995 | Keele et al. .................... 711/4 |
| 6,128,698 A | * | 10/2000 | Georgis ....................... 711/111 |
| 6,453,277 B1 | * | 9/2002 | Helsley et al. ................. 703/24 |
| 6,557,073 B1 | * | 4/2003 | Fujiwara et al. ............. 711/111 |
| 6,701,455 B1 | * | 3/2004 | Yamamoto et al. ........... 714/18 |
| 6,745,212 B1 | | 6/2004 | Kishi et al. |
| 6,779,058 B1 | | 8/2004 | Kishi et al. |
| 2002/0144044 A1 | * | 10/2002 | Moon et al. ................. 710/302 |
| 2003/0037211 A1 | * | 2/2003 | Winokur ...................... 711/162 |
| 2003/0135672 A1 | * | 7/2003 | Yip et al. ...................... 710/72 |
| 2003/0154340 A1 | * | 8/2003 | Bolt et al. ................... 710/305 |
| 2004/0034811 A1 | | 2/2004 | Trimmer et al. |
| 2004/0044828 A1 | * | 3/2004 | Gibble et al. ................... 711/4 |
| 2004/0044855 A1 | * | 3/2004 | Carlson et al. .............. 711/154 |
| 2004/0098244 A1 | * | 5/2004 | Dailey et al. ................. 703/24 |
| 2004/0111251 A1 | * | 6/2004 | Trimmer et al. .............. 703/26 |
| 2004/0148484 A1 | * | 7/2004 | Watanabe et al. ........... 711/170 |
| 2004/0153614 A1 | | 8/2004 | Bitner et al. |
| 2004/0230724 A1 | * | 11/2004 | Stager et al. ................. 710/68 |

FOREIGN PATENT DOCUMENTS

JP 11-272426 8/1999

* cited by examiner

*Primary Examiner*—Hong Kim
(74) *Attorney, Agent, or Firm*—Mattingly, Stanger, Malur & Brundidge, PC

(57) ABSTRACT

An object of the present invention is to shorten a transfer time when a virtual tape volume is used on another computer. A system A incorporating a virtual tape unit is connected to a system B at a remote place via a network. A virtual tape transfer processing unit of the present invention inputs and outputs a virtual tape volume of the system A between virtual tape management information and a virtual tape file. The virtual tape file is copied using a copy function between magnetic disk drives so as to be asynchronous to the systems. An input/output request conversion part allows a tape using task of the system B to use the virtual tape file as a magnetic tape file.

2 Claims, 8 Drawing Sheets

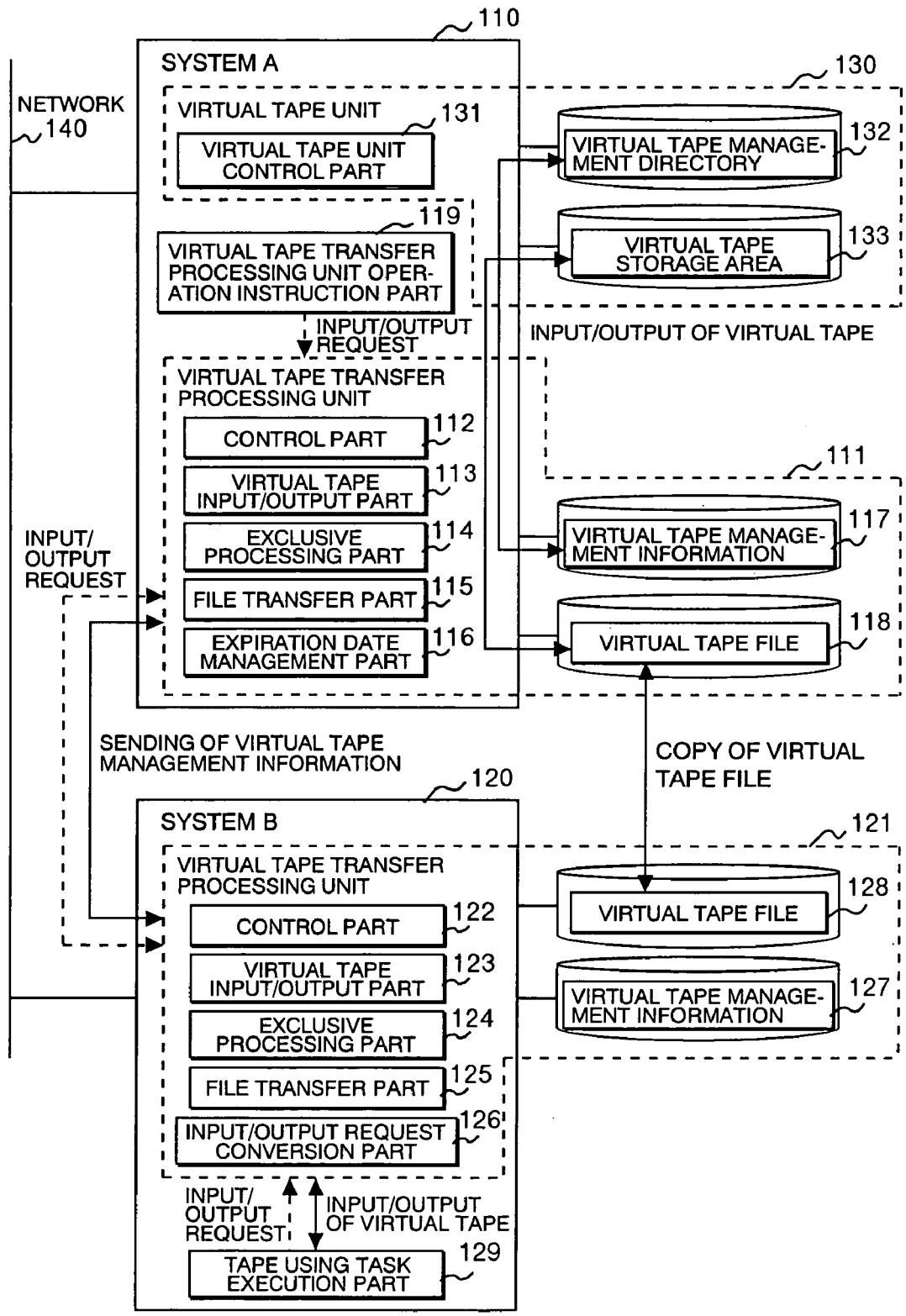

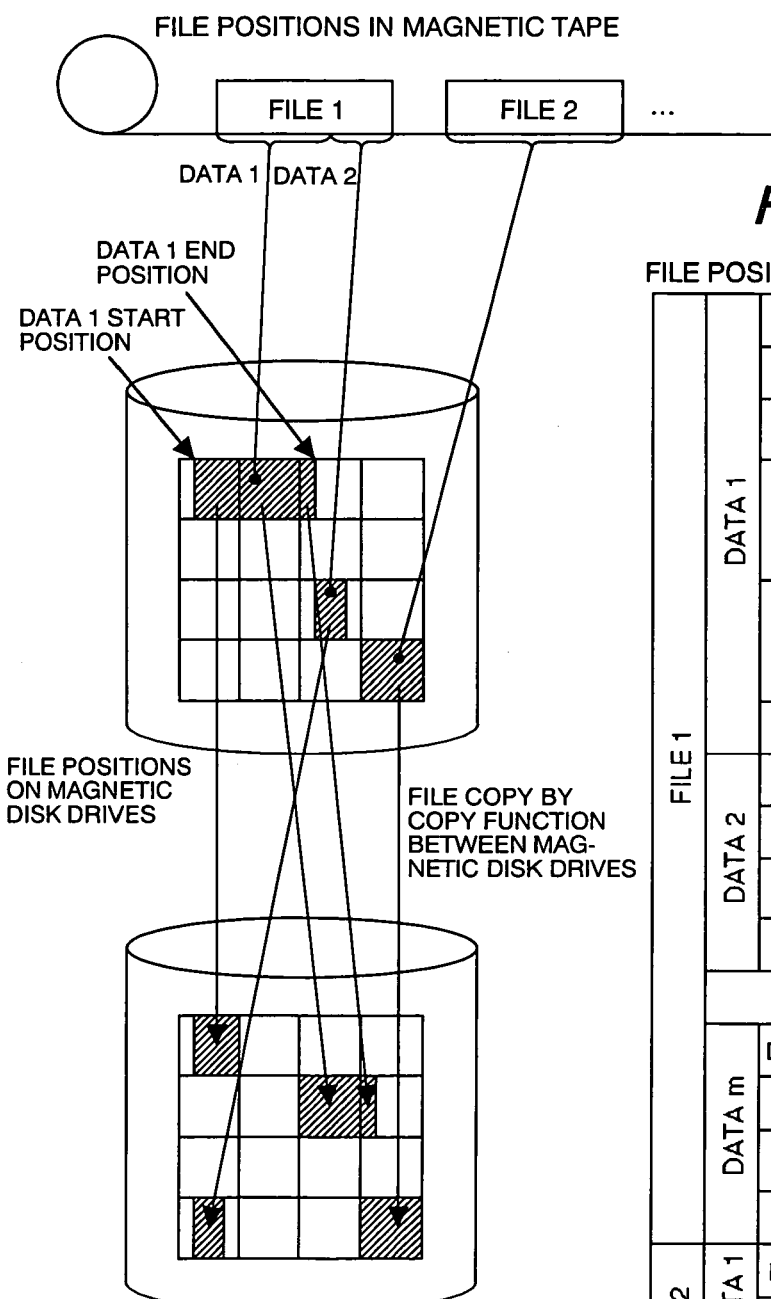

TAPE MANAGEMENT METHOD BY WHICH A VIRTUAL TAPE FILE EMULATED ON A DISK DRIVE IS COPIED BETWEEN DISK DRIVES

BACKGROUND OF THE INVENTION

The present invention relates to a technique for transferring tape information between a plurality of computer systems. There are magnetic tapes as conventionally used recording media which provide access at a speed lower than that of magnetic disk drives. As exemplified in Japanese Unexamined Patent Application Publication No. Hei 11-272426, in recent years, there have been developed virtual tape units which permit access faster than actual magnetic tapes by virtually emulating the tape units on magnetic disk drives capable of access at a higher speed.

SUMMARY OF THE INVENTION

When using a virtual tape volume on another computer system, there is a method for outputting a data set to a magnetic tape once to carry the magnetic tape itself to another computer system for use. There is also a method for transferring a data set which has imaged a disk file using a communication line between systems for use.

When the data set is outputted to the magnetic tape once for use, it requires a long time for input/output processing to/from the magnetic tape as compared with a virtual tape. Further, the cost of operation for carrying the magnetic tape is high.

When the file is transferred using the communication line between systems for use, the load on the systems on the transferring side and the transferred side is large during the file transfer processing. In addition, the program handling the tape to use the transferred file is changed to handle the disk file, whereby the conventional task must be changed. The cost concerning the change of the task is high.

An object of the present invention is to make processing of a task using a virtual tape volume on another computer system faster and to reduce the cost.

In the present invention, to use a virtual tape volume on another computer system without using a magnetic tape, the virtual tape volume is transferred using a communication line. Specifically, to copy a virtual tape file, a copy function between disk drives operated to be asynchronous to systems, not communication between the systems, is used.

BRIEF DESCRIPTION OF THE DRAWINGS

FIG. 1 is a configuration diagram including an embodiment of the present invention;

FIG. 3A is a copy function between magnetic disk drives;

FIG. 3B is a structure example of file position information;

DETAILED DESCRIPTION OF THE PREFERRED EMBODIMENT

Figure 2A:
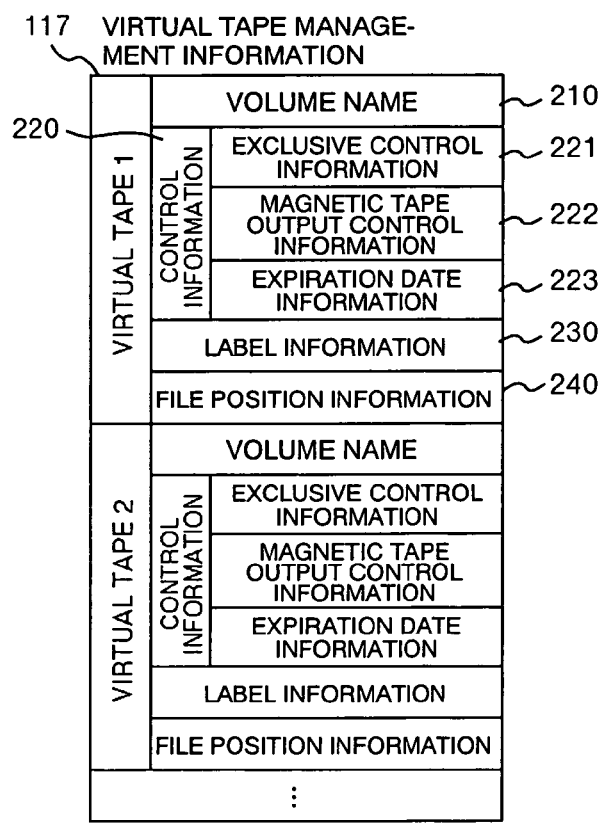
FIG. 2A is a structure example of virtual tape management information in FIG. 1.

Embodiments of the present invention will be described below in detail using the drawings.

FIG. 1 is a configuration diagram of a network system which connects, via a network, a computer system and another computer system including an embodiment of the present invention. An embodiment in which virtual tape transfer processing is performed between a system incorporating a virtual tape unit and another system will be described using FIG. 1. In the drawing, the solid line arrows indicate data flows, and the dashed arrows indicate processing flows.

A system A 110 is connected to a virtual tape unit 130 and has a virtual tape transfer processing unit 111 and a virtual tape transfer processing unit operation instruction part 119.

The virtual tape transfer processing unit 111 has a control part 112, a virtual tape input/output part 113, an exclusive processing part 114, a file transfer part 115, an expiration date management part 116, virtual tape management information 117, and a virtual tape file 118.

A system B 120 has a virtual tape transfer processing unit 121 and a tape using task execution part 129.

The virtual tape transfer processing unit 121 has a control part 122, a virtual tape input/output part 123, an exclusive processing part 124, a file transfer part 125, an input/output request conversion part 126, virtual tape management information 127, and a virtual tape file 128.

The virtual tape unit 130 has a virtual tape unit control part 131, a virtual tape management directory 132, and a virtual tape storage area 133.

The virtual tape unit control part 131 of the system A and the input/output request conversion part 126 of the system B each have a mechanism converting an input/output request to the tape unit to input/output to/from a disk.

The system A 110 and the system B 120 are connected via a network 140. Data transfer and input/output request between the systems are performed via the network 140. The virtual tape file 118 and the virtual tape file 128 have a copy function between magnetic disk drives and are stored into the magnetic disk drives capable of copying the files to be asynchronous to the systems.

A processing flow using a virtual tape volume of the system A 110 in input processing of the tape using task execution part 129 of the system B 120 will be described using FIG. 1.

The tape using task execution part 129 gives a virtual tape input request. The exclusive processing part 124 locks the virtual tape file 128. The control part 122 gives a virtual tape input request to the virtual tape transfer processing unit 111.

When the control part 112 receives the input request, the exclusive processing part 114 checks whether the virtual tape volume is usable. When it is usable, the virtual tape volume and the virtual tape file 118 are locked.

Whether the current virtual tape has already been transferred is checked. When the current virtual tape has not been transferred, the virtual tape input/output part 113 creates the virtual tape management information 117 (which defines the structure of the tape file and will be described later in detail) and the virtual tape file 118 based on the virtual tape volume. That is, the virtual tape file 118 (the same data set as that of the virtual tape storage area 133) is created from the virtual tape storage area 133. The virtual tape file 118 serves as a work area to the virtual tape storage area 133. This is for preventing the processing of the system A from being interrupted by file transfer.

The file transfer part 115 transfers the virtual tape file 118 to the virtual tape file 128 using the copy function between the magnetic disk drives so as to be asynchronous to the systems, and stores file position information on the transferred side into the virtual tape management information 117. The control part 112 copies the virtual tape management information 117 to the virtual tape management information 127. A technique for copying data between systems without any load on a host computer is exemplified in Japanese Unexamined Patent Application Publication No. 2000-305856.

When the current virtual tape has been transferred to the system B 120, the control part 112 notifies, to the virtual tape transfer processing unit 121, that the virtual tape is usable.

When the control part 122 receives the notification that the virtual tape is usable, the input request from the tape using task execution part 129 is converted by the input/output request conversion part 126. The virtual tape management information 127 and the virtual tape file 128 are used in the input processing of the tape using task execution part 129 using the virtual tape input/output part 123.

When the input processing is completed, the control part 122 notifies, to the virtual tape transfer processing unit 111, that use of the virtual tape is completed. The exclusive processing part 114 unlocks the virtual tape volume and the virtual tape file 118. The exclusive processing part 124 unlocks the virtual tape file 128.

A processing flow in which the tape using task execution part 129 of the system B 120 requests output of the virtual tape volume of the system A 110 will be described using FIG. 1.

The tape using task execution part 129 gives a virtual tape output request. The exclusive processing part 124 locks the virtual tape file 128. The control part 122 gives a virtual tape output request to the virtual tape transfer processing unit 111.

When the control part 112 receives the output request, the exclusive processing part 114 checks whether the virtual tape volume is usable. When it is usable, the virtual tape volume and the virtual tape file 118 are locked. The control part 112 notifies, to the virtual tape transfer processing unit 121, that the virtual tape is usable. The virtual tape volume is, e.g., one magnetic tape and includes a plurality of files. Exclusive control is performed in the virtual tape management directory 132 for each virtual volume. Exclusive control is performed in the virtual tape management information 117 for each file.

When the control part 122 receives the notification that the virtual tape is usable, the input/output request conversion part 126 converts the output request from the tape using task execution part 129 between the tape interface and the disk interface. The virtual tape input/output part 123 is used to output it to the virtual tape management information 127 and the virtual tape file 128.

After the completion of the output processing, the file transfer part 125 transfers the virtual tape file 128 to the virtual tape file 118 using the copy function between the magnetic disk drives so as to be asynchronous to the systems, and stores the file position information on the transferred side into the virtual tape management information 127. The control part 122 copies the virtual tape management information 127 to the virtual tape management information 117 to output the virtual tape volume based on the virtual tape management information 117 and the virtual tape file 118. Specifically, it returns the data to the virtual tape storage area 133 to rewrite the virtual tape management directory 132.

When the transfer of the virtual tape management information 127 and the virtual tape file 128 to the system A 110 is completed, the control part 122 notifies, to the virtual tape transfer processing unit 111, that use of the virtual tape is completed. The exclusive processing part 114 unlocks the virtual tape volume and the virtual tape file 118. The exclusive processing part 124 unlocks the virtual tape file 128.

The expiration date management part 116 monitors a renting expiration date in the task to rent the virtual tape of the system A 110 to the system B 120. When the expiration date is expired, it automatically performs virtual tape returning processing. The expiration date management part 116 gives a returning request. The control part 122 of the system B performs returning control.

The virtual tape transfer processing unit operation instruction part 119 outputs the request to the virtual tape transfer processing unit 111 when performing the virtual tape transfer processing from the system A side.

Figure 2B:
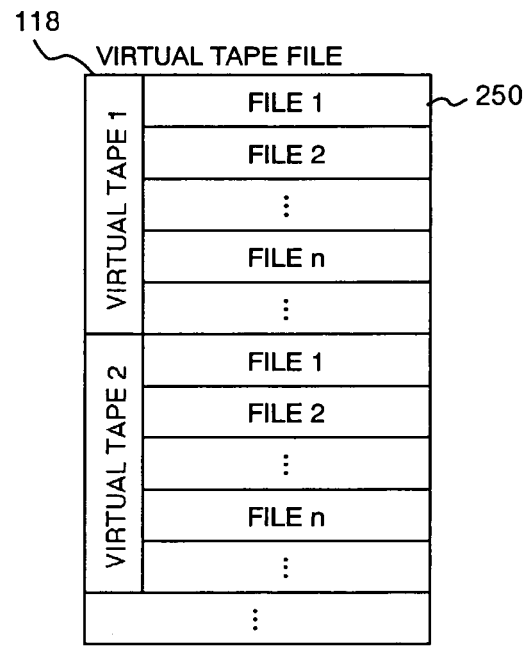
FIG. 2B is a structure example of a virtual tape file in FIG. 1.

FIG. 2A is a structure example of the virtual tape management information 117 used for transferring a virtual tape. FIG. 2B is a structure example of the virtual tape file 118. The virtual tape management information 117 stores a volume name 210, control information 220, label information 230, and file position information 240 for each virtual tape transferred. The control information 220 has exclusive control information 221, magnetic tape output control information 222, and expiration date information 223, which are set according to a task used. The virtual tape file 118 stores virtual tape files 250.

FIG. 3A is a file copy example by the copy function between the magnetic disk drives. FIG. 3B is a file position information example.

The magnetic disk drives on the transferring side and the transferred side are mapped in a copiable unit, respectively. One file is one successive data piece on a magnetic tape. One file on the magnetic disk drive is divided into some successive data pieces to be written.

In the copy between the magnetic disk drives, data of each block may be written into a position different from the magnetic disk drive on the transfer ring side. The file position information 240 stores data start and end positions, data continuation and end specification, and copying side block positions and copied side block positions of data for each successive data piece.

Figure 4:
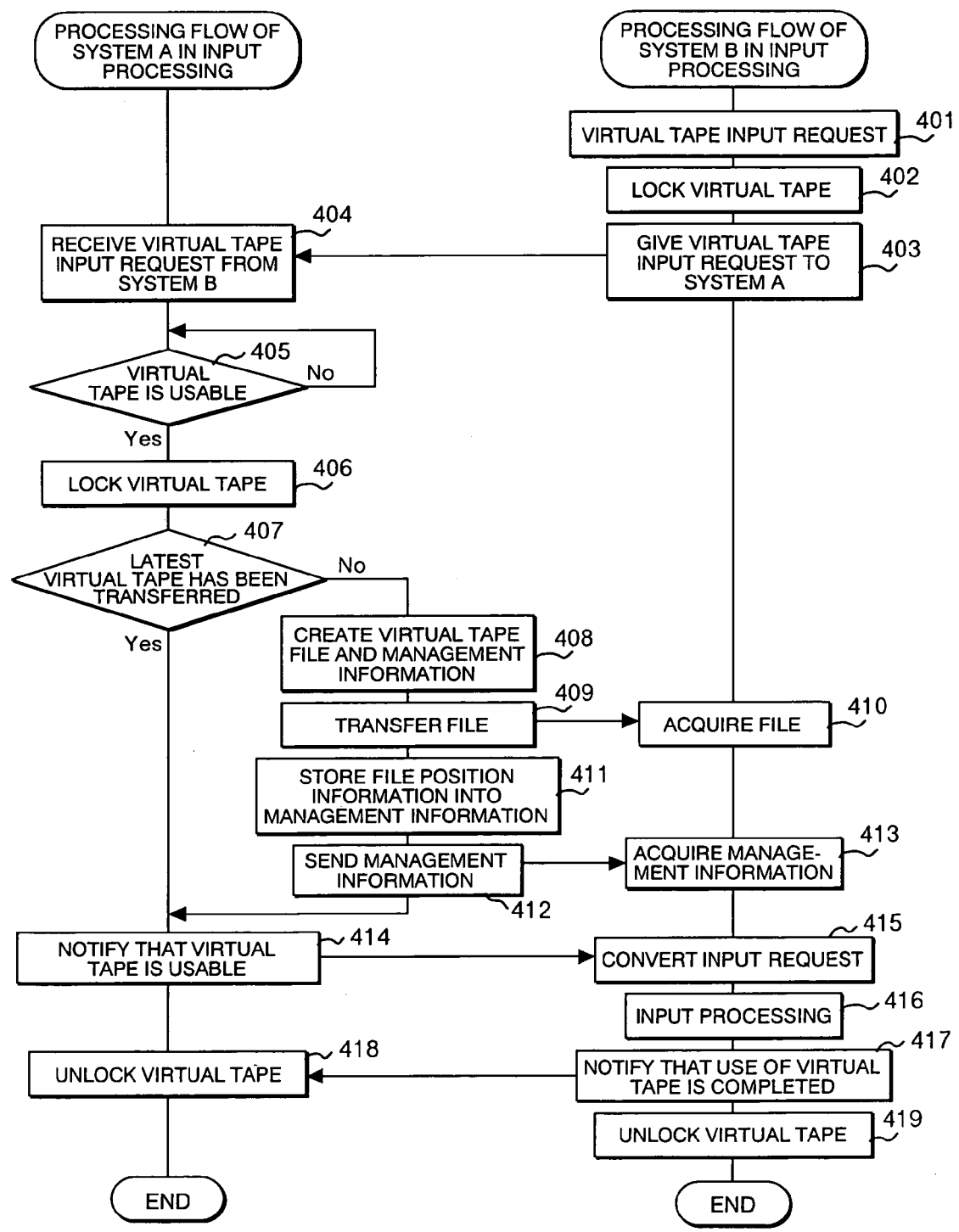
FIG. 4 is a flowchart of a virtual tape input processing example.

FIG. 4 is a flowchart showing a flow of input processing. The procedure of the input processing will be described using FIG. 4.

The tape using task execution part 129 of the system B 120 gives a virtual tape input request (step 401).

When the input request is given, the system A 110 and the system B 120 lock the respective targeted virtual tapes so as not to be used in other processing. First, the system B 120 locks the virtual tape file 128 (step 402). The locking is performed by writing exclusive control specification into the exclusive control information 221 in the control information 220 in the virtual tape management information 127 by the exclusive processing part 124.

Next, the control part 122 gives a virtual tape input request to the virtual tape transfer processing unit 111 (step 403). When the control part 112 receives the input request (step 404), the exclusive processing part 114 checks whether the targeted virtual tape volume is usable (step 405). When the virtual tape volume is usable, the exclusive processing part 114 gives, to the virtual tape unit 130, a request to allow the virtual tape volume to be in use, thereby writing exclusive control specification into the exclusive control information 221 of the virtual tape management information 117 to lock the virtual tape file 118 (step 406).

Whether the label information 230 is stored into the targeted virtual tape management information 117 is checked. When it is stored, the update dates of the virtual tape volume and the virtual tape management information 117 are compared to check whether the virtual tape is transferred (step 407). When the label information 230 does not exist or the update date of the virtual tape volume is later, the virtual tape is transferred.

For the transfer of the virtual tape, first, the virtual tape input/output part 113 creates the virtual tape file 118 to be transferred based on the virtual tape storage area 133 and stores the label information of the targeted volume of the virtual tape management directory 132 into the label information 230 of the virtual tape management information 117 (step 408). The file transfer part 115 uses the copy function between the magnetic disk drives to transfer the virtual tape file 118 to the virtual tape file 128 of the system B 120 so as to be asynchronous to the systems (steps 409, 410). The file position information 240 corresponding the file positions on the transferring side and the transferred side with each other is stored into the virtual tape management information 117 (step 411). The control part 112 sends the virtual tape management information 117 to the virtual tape information 127 of the system B 120 (steps 412, 413).

When the virtual tape has been transferred to the system B 120, the control part 112 notifies, to the system B 120, that the virtual tape is usable (step 414). The input request of the tape using task execution part 129 is converted by the input/output request conversion part 126 (step 415). The virtual tape input/output part 123 uses the volume name 210 and the label information 230 in the virtual tape management information 127 and the virtual tape file 128 for the input processing (step 416).

After the completion of the input processing, the control part 122 notifies, to the system A 110, that use of the virtual tape is completed (step 417). The exclusive processing part 114 gives, to the virtual tape unit 130, a request to complete use of the virtual tape volume, removes the exclusive control specification of the exclusive control information 221 of the virtual tape management information 117, and unlocks the virtual tape file 118 (step 418). The exclusive processing part 124 removes the exclusive control specification of the exclusive control information 221 of the virtual tape management information 127, and unlocks the virtual tape file 128 (step 419).

As an operation example of the input processing, the virtual tape transfer processing unit operation instruction part 119 performs virtual tape transfer processing to the system B 120 at a predetermined timing or at a timing for each fixed time. When the transfer of the virtual tape is completed before the tape using task execution part 129 gives the input request, the virtual tape transfer processing is eliminated at the input processing to make the input processing faster. The tape using task execution part 129 has the effect of executing the processing quickly without waiting for the transfer of the virtual tape. The virtual tape transfer processing flow is as follows.

The virtual tape transfer processing unit operation instruction part 119 gives a tape transfer request. The system A 110 and the system B 120 lock the virtual tapes. The virtual tape input/output part 113 creates the virtual tape file 118 to be transferred based on the virtual tape storage area 133 to store the label information of the targeted volume of the virtual tape management directory 132 into the label information 230 of the virtual tape management information 117. The file transfer part 115 sends the virtual tape file 118 to the system B 120 to store the file position information 240 into the virtual tape management information 117. The control part 112 sends the virtual tape management information 117 to the system B 120.

Figure 5:
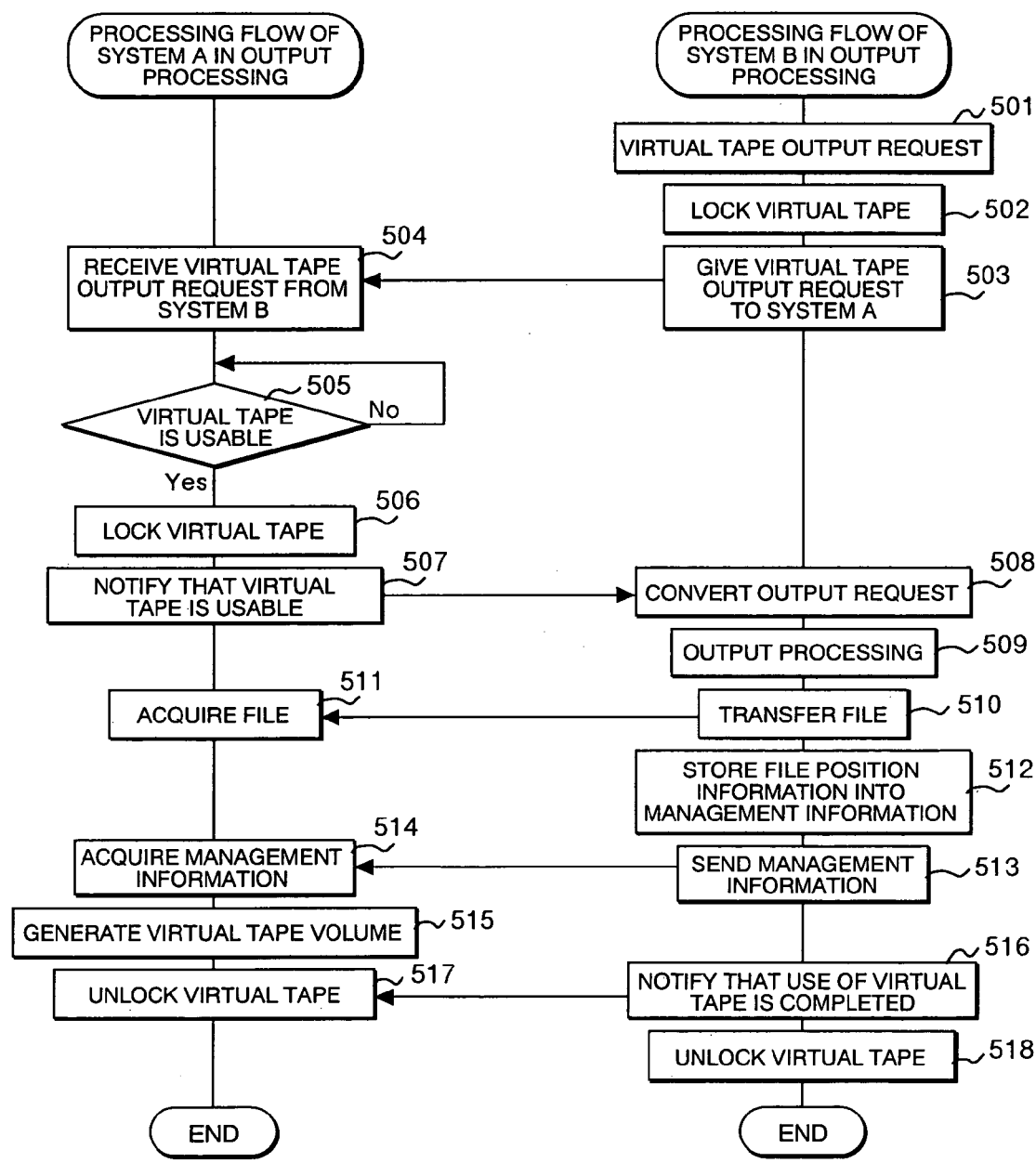
FIG. 5 is a flowchart of a virtual tape output processing example.

FIG. 5 is a flowchart showing a flow of output processing. The procedure of the output processing will be described using FIG. 5.

The tape using task execution part 129 of the system B 120 gives a virtual tape output request (step 501).

When the output request is given, the system A 110 and the system B 120 lock the targeted virtual tapes so as not to be used in other processing. The system B120 locks the virtual tape file 128 (step 502). The locking is performed by writing exclusive control specification into the exclusive control information 221 in the control information 220 in the virtual tape management information 127 by the exclusive processing part 124.

The control part 122 gives a virtual tape output request to the virtual tape transfer processing unit 111 (step 503). When the control part 112 receives the output request (step 504), the exclusive processing part 114 checks whether the targeted virtual tape volume is usable (step 505). When the virtual tape volume is usable, the exclusive processing part 114 gives, to the virtual tape unit, a request to allow the virtual tape volume to be in use, thereby writing exclusive control specification into the exclusive control information 221 of the virtual tape management information 117 to lock the virtual tape file 118 (step 506).

When the system A 110 and the system B 120 lock them, the control part 112 notifies, to the system B 120, that the virtual tape is usable (step 507). The output request of the tape using task execution part 129 is converted by the input/output request conversion part 126 (step 508). The virtual tape input/output part 123 stores the output result into the label information 230 in the virtual tape management information 127 and the virtual tape file 128 (step 509). After the completion of the output processing, the virtual tape is transferred.

For the transfer of the virtual tape, the file transfer part 125 uses the copy function between the magnetic disk drives which is known in the control of a magnetic disk to transfer the virtual tape file 128 to the virtual tape file 118 of the system A 110 so as to be asynchronous to the systems (steps 510, 511). The file position information 240 corresponding the file positions on the transferring side and the transferred side with each other is stored into the virtual tape management information 127 (step 512). The control part 122 sends the virtual tape management information 127 to the virtual tape information 117 of the system A110 (steps 513, 514). The virtual tape input/output part 113 outputs the virtual tape volume based on the virtual tape management information 117 and the virtual tape file 118 (515).

After the completion the output processing of the virtual tape volume, the control part 122 notifies, to the system A 110, that use of the virtual tape is completed (step 516). The exclusive processing part 114 gives a request to complete use of the virtual tape volume to the virtual tape unit 130, removes the exclusive control specification of the exclusive control information 221 of the virtual tape management information 117, and unlocks the virtual tape file 118 (step 517). The exclusive processing part 124 removes the exclusive control specification of the exclusive control information 221 of the virtual tape management information 127 to unlock the virtual tape file 128 (step 518).

Figure 6:
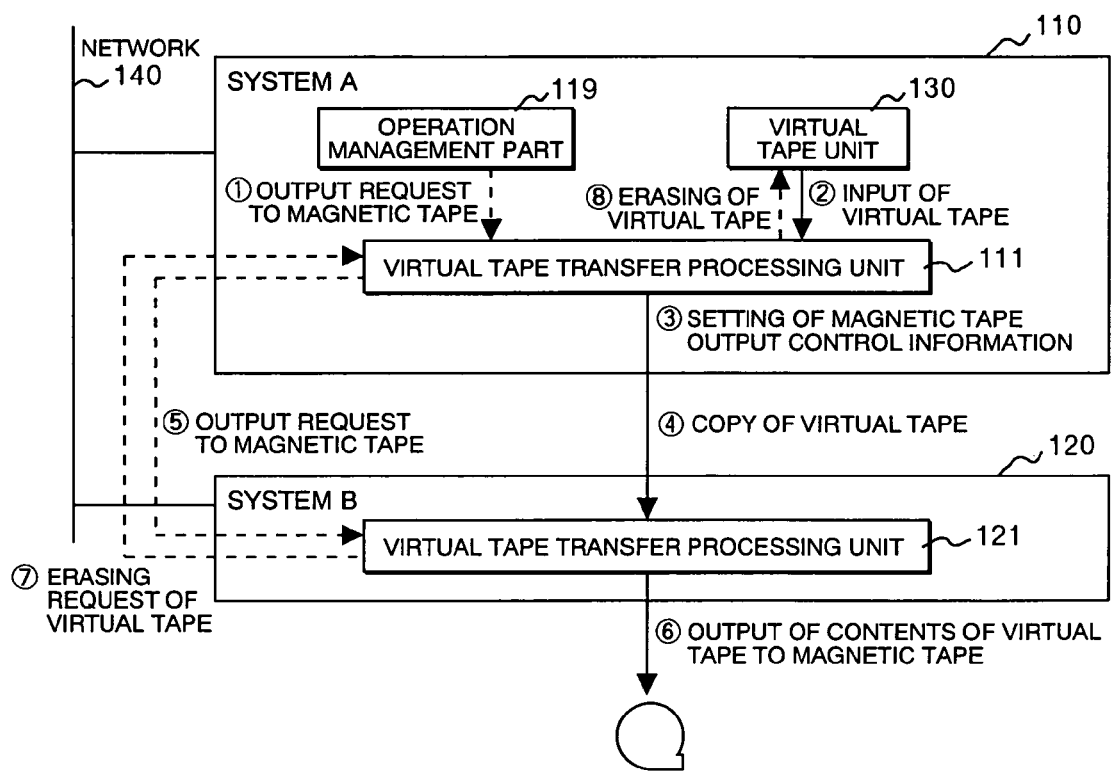
FIG. 6 is an embodiment of automatic output processing to a magnetic tape in a system at a remote place.

FIG. 6 is an embodiment in which the virtual tape is automatically outputted to the magnetic tape on another system. The drawing assumes FIGS. 1 and 2 and represents those related to this embodiment. According to this embodiment, a backup copy can be created at a remote place to take precautions against disaster.

The virtual tape transfer processing unit operation instruction part 119 specifies the presence or absence of erasing of a virtual tape on the outputting side to give a request to output the virtual tape of the system A 110 to the magnetic tape of the system B 120.

The virtual tape input/output part 113 writes output specification to the magnetic tape into the magnetic tape output control information 222 in the control information 220 of the virtual tape management information 117 to specify the presence or absence of erasing of the virtual tape on the outputting side.

As in the input processing, the virtual tape is transferred to the system B 120. After the completion of the transfer of the virtual tape, the control part 112 gives an output request to the magnetic tape to the virtual tape transfer processing unit 121. The virtual tape input/output part 123 checks the magnetic tape output control information 222 of the virtual tape management information 127 to output the virtual tape with the output specification to the magnetic tape to an actual magnetic tape.

After the completion of the output to the magnetic tape, when there is erasing specification of the virtual tape on the outputting side in the magnetic tape output control information 222 of the virtual tape management information 127, the control part 122 gives an erasing request of the targeted virtual tape to the virtual tape transfer processing unit 111 to erase the virtual tape on the outputting side.

Figure 7:
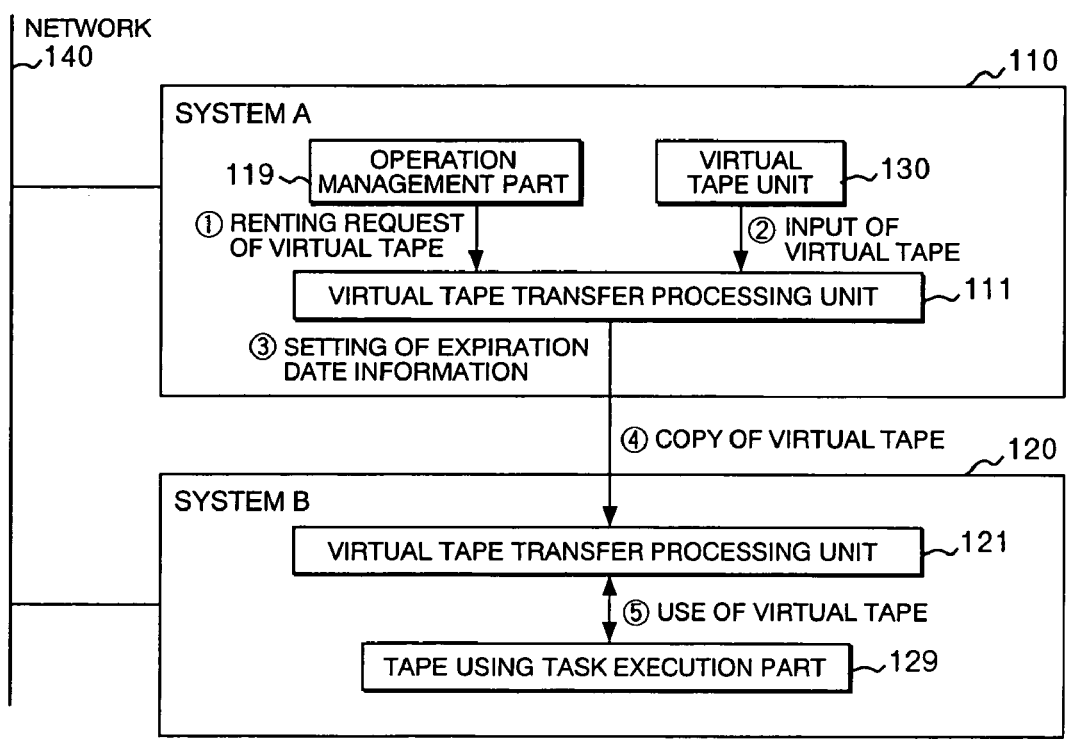
FIG. 7 is an embodiment of renting processing of a virtual tape renting task.
Figure 8:
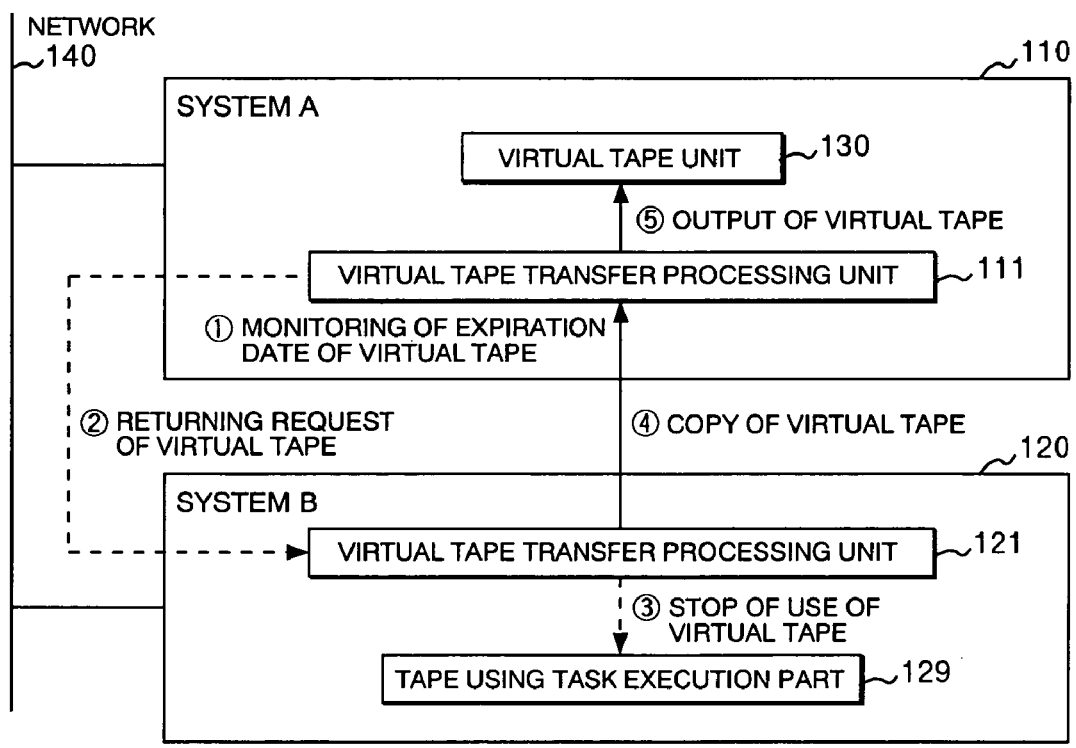
FIG. 8 is an embodiment of returning processing at the completion of the virtual tape renting task.

FIG. 7 is an embodiment of a virtual tape renting task. FIG. 8 is an embodiment of virtual tape returning processing at the completion of the renting task. These drawings assume FIGS. 1 and 2 and represent those related particularly to the respective embodiments.

In the processing flow of the virtual tape renting task, the virtual tape transfer processing unit operation instruction part 119 gives a renting request of the virtual tape to the virtual tape transfer processing unit 111. The virtual tape input/output part 113 specifies the expiration date information 223 of the virtual tape management information 117 to transfer the virtual tape of the system A 110 to the system B 120, as in the input processing.

The virtual tape expiration date is monitored by the expiration date management part 116. The expiration date management part 116 checks the expiration date information 223 of the virtual tape management information 117 at a predetermined timing or a timing for each fixed time. When the expiration date is expired, it gives a returning request of the virtual tape to the virtual tape transfer processing unit 121.

When the control part 122 receives the returning request, the virtual tape of the system B 120 is outputted to the virtual tape volume on the virtual tape unit 130 of the system A 110, as in the output processing.

As described above, according to the present invention, the magnetic tape is not used for transferring the virtual tape volume, thereby shortening the processing time and reducing the operation cost of the magnetic tape. The copy function between the magnetic disk drives which is operated to be asynchronous to the systems is used to copy the virtual tape file to reduce the load of the systems of the file transfer processing. The file on the magnetic disk is used as the file of the magnetic tape by conversion of the input/output request. It is unnecessary to change the conventional task. The cost concerning the change of the task can be reduced.

In this embodiment, the magnetic disk is mainly described. It is not limited to the type of a recording medium and may be an optical disk.

According to the present invention, the transfer time of the virtual tape volume between the systems can be shortened.

What is claimed is:

1. A method for tape management in a network system which connects, via a network:
a first system which virtually emulates a magnetic tape unit on a disk drive and has a virtual tape unit having a virtual tape storage area, a first virtual tape file, and a first virtual tape transfer processing unit having first virtual tape management information defining a structure of said first virtual tape file; and
a second system having a second virtual tape file, a second virtual tape transfer processing unit having second virtual tape management information defining a structure of said second virtual tape file, and a tape using task execution part, said method comprising:
a step in which said tape using task execution part gives a virtual tape input request;
a step in which said second virtual tape transfer processing unit locks said second virtual tape file to give a virtual tape input request to said first virtual tape transfer processing unit;
a step in which according to said input request, said first virtual tape transfer processing unit locks a virtual tape volume and said first virtual tape file to create said first virtual tape file and said first virtual tape management information to said input request;
a step in which said first virtual tape file is transferred to said second virtual tape file using a copy function between disk drives so as to be asynchronous to said first system;
a step in which said second virtual tape transfer processing unit allows said tape using task execution part to use said second virtual tape file;
a step in which said first virtual tape transfer processing unit unlocks said virtual tape volume and said first virtual tape file; and
a step in which said second virtual tape transfer processing unit unlocks said second virtual tape file.

2. A method for tape management in a network system which connects, via a network:
a first system which virtually emulates a magnetic tape unit on a disk drive and has a virtual tape unit having a virtual tape storage area, a first virtual tape file, and a first virtual tape transfer processing unit having first virtual tape management information defining a structure of said first virtual tape file; and
a second system having a second virtual tape file, a second virtual tape transfer processing unit having second virtual tape management information defining a structure of said second virtual tape file, and a tape using task execution part, said method comprising:
a step in which said tape using task execution part gives a virtual tape output request;
a step in which said second virtual tape transfer processing unit locks said second virtual tape file to give a virtual tape output request to said first virtual tape transfer processing unit;

a step in which according to said output request, said first virtual tape transfer processing unit locks a virtual tape volume and said first virtual tape file to notify, to said second virtual tape processing unit, that the virtual tape is usable;

a step in which said second virtual tape transfer processing unit outputs said second virtual tape file in response to said notification to transfer said second virtual tape file to said first virtual tape file using a copy function between disk drives;

a step in which said first virtual tape transfer processing unit returns data from said first virtual tape file and said first virtual tape management information to said virtual tape storage area after said transfer;

a step in which said first virtual tape transfer processing unit unlocks said virtual tape volume and said first virtual tape file when said transfer is completed; and a step in which said second virtual tape transfer processing unit unlocks said second virtual tape file when said transfer is completed.

* * * * *